(No Model.)

B. F. JONES.
MACHINE FOR HOLDING AND HANDLING FRUIT JARS.

No. 312,642. Patented Feb. 24, 1885.

Witnesses
H. B. Williams.
Seth Dean

Inventor:
Benjamin F. Jones

UNITED STATES PATENT OFFICE.

BENJAMIN F. JONES, OF GLENWOOD, IOWA.

MACHINE FOR HOLDING AND HANDLING FRUIT-JARS.

SPECIFICATION forming part of Letters Patent No. 312,642, dated February 24, 1885.

Application filed July 12, 1884. (No model.)

*To all whom it may concern:*

Be it known that I, BENJAMIN F. JONES, a citizen of the United States, residing at Glenwood, in the county of Mills and State of Iowa, have invented a new and useful Machine for Holding and Handling Fruit-Jars, of which the following is a specification.

My invention relates to improvements in pinchers or tongs for handling hot jars of fruit or vegetables, and for holding them while they are being capped or uncapped; and the objects of my invention are, first, to avoid touching with the hands hot jars, cups, or cans while putting up fruit; second, to secure a more ready and convenient means of capping or securing jars, cups, and cans of fruit; third, to provide means for more perfectly sealing or securing fruit put up in jars, cups, or cans; fourth, to furnish means for the more easy and safe handling and sealing or closing of fruit jars, cups, and cans at any desired degree of heat; fifth, to more perfectly and uniformly preserve the quality of fruit put up in jars, cups, and cans; sixth, to more easily and safely open jars, cups, and cans of fruit for use; seventh, to admit of the caps or covers of fruit jars, cups, and cans being more readily removed without injury thereto; eighth, to avoid injuries from the breaking of glass jars and cups containing fruit when closing or opening them.

I attain these objects by the mechanism illustrated in the accompanying drawings, in which—

Figure 1:
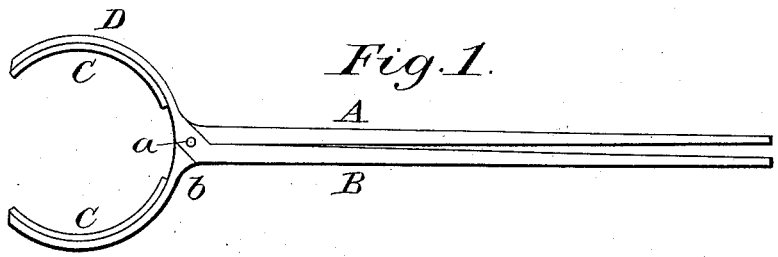
Figure 2:
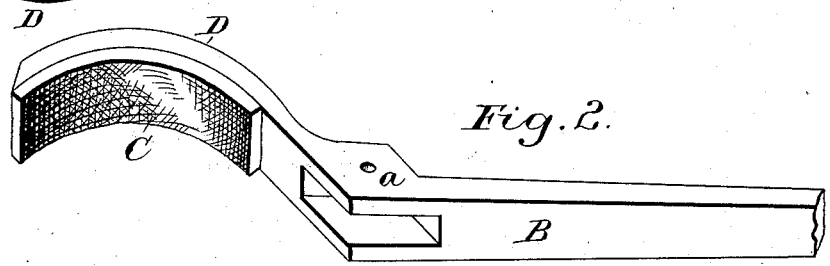
Figure 3:
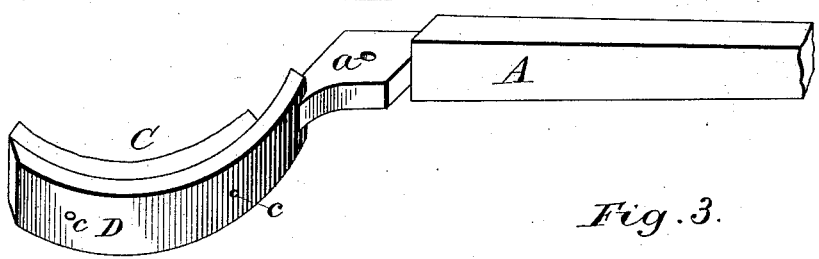
Figure 3:
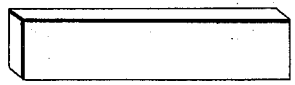
Figure 4:
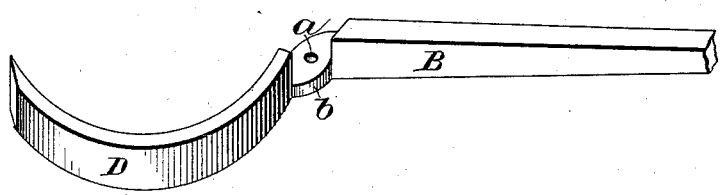

Figure 1 is a plan of the pinchers or tongs ready for use. Fig. 2 is a perspective of the jaws or parts detached as they appear when made with a mortise-joint. Fig. 3 is a perspective of the rubber cloth or leather lining of the jaws. Fig. 4 is a perspective of one of the jaws or parts detached, as it appears when made with a lap-joint.

Similar letters refer to similar parts throughout the several views.

My invention consists, essentially, of a pair of pinchers or tongs with the jaws D made longer than those in common use, and curved so that each one forms an arc of a circle, making the two jaws, when attached at the joint, a concave with respect to each other. The diameter of the circle of which the jaws are arcs is of any desired length, and the jaws need not be parts of a true circle.

I make the jaws D of metal, merely heavy enough to give the requisite strength, and prefer the lap-joint, (shown in Fig. 4,) as being cheaper and lighter, and allowing the jaws and handles or rims A B to be made of malleable castings. I join the jaws by a screw or rivet at the point *a*.

On the concave side of the jaws D, I attach, by screws or rivets, a piece of rubber, rubber belting, leather, felt, or cloth, or cork, C, (or any soft substance which has a tendency to adhere to glass or smooth surfaces,) passing the screws or rivets through the jaws D at about the points *c*. The pieces C not only serve to prevent the turning of the jar or other vessel, but also act as cushions to prevent the force applied through the jaws breaking it.

I make the handles or rims A B of any convenient length and sufficiently heavy to be substantially rigid.

My invention is used for simply handling hot vessels in the same manner as common tongs or pinchers, the jaws D having sufficient width to prevent the vessels upsetting.

When used for the purpose for which it is more especially designed, the pinchers or tongs are placed around any convenient part of the jar, cup, or can, and a slight pressure with one hand of the operator on the handles holds the vessel stationary and leaves the other hand free to manipulate the cover with the common lever or other appliances in either closing or opening it.

While they are more especially useful in closing vessels containing fruit heated to any desired degree without personal injury or inconvenience, the pinchers or tongs will be found useful in opening such vessels as may have stood until the covers have become gummed and stuck fast. The covers may be forced off without prying up the edges or otherwise injuring them.

I am aware that prior to my invention pinchers or tongs have been made with curved jaws. I do not, therefore, claim such a combination, broadly; but What I do claim as my invention, and desire to secure by Letters Patent, is—

The combination, in pinchers or tongs, of curved jaws D, of metal, with non-metallic pads or cushions C, attached thereto, with mortise or lap-joint $a$, and rigid handles A B, connected together by a screw or rivet, all constructed substantially as described, and for the purposes specified.

BENJAMIN F. JONES.

Witnesses:
H. B. WILLIAMS,
SETH DEAN.